UNITED STATES PATENT OFFICE.

GEORGE P. CHAPPELL, OF NEW YORK, N. Y.

PROCESS OF MAKING ARTIFICIAL STONE AND FORMING ARTICLES THEREFROM.

SPECIFICATION forming part of Letters Patent No. 703,640, dated July 1, 1902.

Application filed February 23, 1901. Serial No. 48,430. (No specimens.)

*To all whom it may concern:*

Be it known that I, GEORGE P. CHAPPELL, a citizen of the United States, residing at New York, in the county of New York and State of New York, have invented certain new and useful Improvements in Processes of Making Artificial Stone and of Forming Articles Therefrom; and I do hereby declare the following to be a full, clear, and exact description of the invention, such as will enable others skilled in the art to which it appertains to make and use the same.

My invention relates to improvements in processes of making self-hardening plastic compositions termed "cement" and of forming articles therefrom, and more particularly to improvements in processes of making and using that class of such compositions the basis of which is a mixture of chlorid and oxid of magnesium.

The objects of my invention are to facilitate and cheapen the manufacture of cement articles and to produce a cement of the general character specified which when soft shall possess greater cohesion or tensile strength than former cements of this class, so that when pressed into shape in molds it may be removed from the molds immediately without waiting for the cement to dry or harden. Former cements of this class have not possessed the necessary strength or cohesion to enable objects formed from them by pressing the cement into shape in molds to be removed from the molds immediately after the desired objects have been formed; but it has been necessary to permit the cement to harden before emptying the molds. As a result such former cements have required the use of a large number of molds in order to form any considerable number of articles from such cements expeditiously, thereby greatly increasing the expense. The cement herein described, however, possesses such cohesion or tensile strength while still in the plastic condition that while it may be pressed into the desired form readily the objects so formed in the molds may be removed therefrom immediately and allowed to dry outside of the molds without losing form.

My invention consists in the novel method of producing the cement and forming articles therefrom, as hereinafter described.

In carrying out my process, to any convenient quantity of chlorid of magnesium I add an equal part, by weight, of water and dissolve the chlorid in this water. Preferably heat is employed to hasten the solution. When the solution has been formed, an amount of oxid of magnesium equal in weight to the total weight of the said solution of chlorid of magnesium is added to such solution and thoroughly mixed and incorporated therewith. This mixing may be done by hand or, particularly where the cement is made in large quantities, by means of any of the well-known mixing-machines. The addition of the oxid converts the chlorid solution into a paste, which, however, is thin and does not have the desired consistency. Therefore I add to it a certain amount of filling material, such as wood-powder, leather-powder, marble-dust, or other suitable finely-divided and small-grained filling material. Such filling material is preferably added by degrees while the paste is being stirred, so that the filling material is thoroughly mixed into and incorporated with the cement paste and the paste becomes a homogeneous mass. After this has been accomplished the pasty mass is subjected to a further working, preferably by a kneading or similar action, for a considerable time. Such further working has the effect of entirely changing the physical character of the mass, converting it from a loose paste, similar to mortar, into a tenacious but very smooth-textured putty-like mass, which may be pressed into shape in suitable molds readily, but which when so pressed into shape may be removed from the molds at once without losing form, and therefore may be placed on suitable supports to dry and harden. By reason of this one mold may be made to do the work which with former cements of this kind could be done only by the aid of several molds. I find that the increase in the strength of the cement while still in the plastic condition is due to this additional working or kneading after the components of the cement have been mixed together thoroughly.

The amount of filling material used will vary somewhat, according to the nature of the filling material employed, the judgment of the workman, and the quality of the articles to be produced. I have obtained good results by adding one part, by weight, of wood-powder to three parts of the paste. I do not limit myself, however, to this proportion of the filling material or to the exact proportions of oxid and chlorid of magnesium and water or to the bringing together of the ingredients of the cement in the manner and order above specified, though I believe that the proportions of oxid and chlorid of magnesium above specified produce the best result and that it is better to add the ingredients in the manner above specified.

In forming articles from this cement by the use of molds I preferably place the molds in a press after filling them with cement and then by means of the press apply pressure to the molds, thereby obtaining increased hardness of the articles so formed when the same are removed from the molds.

I am aware that it is old to form a cement by the mixing of oxid and chlorid of magnesium and water with or without the use of filling material; but such cements as made heretofore have not possessed the necessary tenacity, strength, or adhesiveness when in the pasty condition required to permit them to be withdrawn from the molds directly after the required form has been given, and such lack of strength has been due to the fact that it has been customary to mix the cement only to the extent necessary to thoroughly incorporate the ingredients with one another. I, however, subject the cement paste to a further working for a considerable time after the mixing is complete, and thereby materially alter the character of the paste, giving it a strength or tenacity which it did not possess before, and therefore fitting it for treatment in molds.

Having thus completely described my invention, what I claim, and desire to secure by Letters Patent, is—

1. The herein-described process of producing cement, which consists in forming a mixture of oxid and chlorid of magnesium, water and a filling material, and mixing such ingredients thoroughly and continuing the working of the pasty mass thereby formed until it acquires a putty-like consistency.

2. The herein-described process of producing cement, which consists in producing a pasty mass by the union of oxid and chlorid of magnesium and water, adding to such mass a filling material and thoroughly mixing the same therewith and continuing the working of the pasty mass thereby formed until it has acquired a putty-like consistency.

3. The herein-described process of producing cement, which consists in forming a pasty mass by the union of oxid and chlorid of magnesium, and water, in the proportion of about one part of chlorid of magnesium and of water, each, to two parts of oxid of magnesium, adding to such mass a filling material, and mixing the same thoroughly therewith and continuing the working of the mass so formed until it has acquired a putty-like consistency.

4. The herein-described process of producing molded cement articles, which consists in producing a pasty mass by mixing and working oxid and chlorid of magnesium, water, and a filling material, and continuing the working of the pasty mass thereby formed until it has acquired a putty-like consistency, and then placing such a mass in molds and subjecting it to pressure in the molds.

In testimony whereof I affix my signature in the presence of two witnesses.

GEO. P. CHAPPELL.

Witnesses:
HARRY M. MARBLE,
ABRM. H. GOLDBERG.